Patented Dec. 3, 1946

2,412,176

UNITED STATES PATENT OFFICE 2,412,176

TREATING FATTY OILS

Alexander Schwarcman, Buffalo, N. Y., assignor to Spencer Kellogg and Sons, Inc., Buffalo, N. Y., a corporation of New York No Drawing. Application February 12, 1943, Serial No. 475,651

10 Claims. (Cl. 260—404.8)

This invention relates to treating fatty oils; and it comprises a process of treating fatty oils and especially semi-drying oils, such as soya bean oil, to convert them into drying oils of excellent properties, wherein the semi-drying oil is heated, in admixture with a minor amount of linseed oil or other drying oil, and a small amount such as about 1 to 7 per cent of a polyhydric alcohol, such as glycerine, to form an intermediate product containing uncombined hydroxyl groups, and this intermediate product is reacted with a minor amount of polybasic acid to form a new mixed ester having excellent drying properties; and it comprises the new product thereby obtained; all as more fully hereinafter set forth and as claimed.

As described in my copending applications Serial No. 392,555, filed May 8, 1941, and the continuation-in-part thereof, Serial No. 475,652, filed of even date herewith, the characteristics of many fatty oils including the drying and semi-drying vegetable oils and marine oils are greatly enhanced by reacting such oils with a small amount of polyhydric alcohol, such as glycerine, and reacting the intermediate product with a polybasic acid, such as fumaric, maleic, phthalic acid and their anhydrides. Such a treatment imparts better drying qualities to the oils treated and also imparts quick polymerizing properties. And it has been found that in this manner even semi-drying oils, such as soya bean oil can be substantially improved.

However, I have found that semi-drying oils, such as soya bean oil, do not form perfect films even after treatment in the manner described. I have further found that if the semi-drying oil is mixed with a small amount, preferably between 10 and 20 per cent of a good drying oil, such as linseed oil, and the mixture is subjected to the process described in the copending applications, excellent results are obtained. Apparently under these circumstances some double reaction takes place which combines the constituents of the two oils into a new synthetic oil which dries to substantially as hard a film and polymerizes substantially as rapidly as linseed oil itself, when subjected to a similar treatment.

In a typical embodiment of this invention, 1500 pounds of soya bean oil and 200 pounds of linseed oil were mixed together and heated to about 300° F. Sixty pounds of glycerine were added with 0.5 pound of litharge to serve as a catalyst and the mixture was agitated while the temperature was raised to 450° F. for about one-half hour. At this temperature the free glycerine disappeared and a clear intermediate product was obtained. To this there was added 115 pounds of fumaric acid and the temperature was raised while continuing the agitation to 520° F. At this temperature there was a substantial evolution of water due to the esterification between the uncombined glycerol hydroxyl groups and the added acid. As soon as this evolution of water ceased a clear homogeneous product was obtained having excellent drying properties. This product can be used and sold as such, but it is usually more advantageous to raise the temperature to about 570° F. for a short time. Within a short time there is obtained a polymerized oil having the consistency of linseed oil stand oil; for example, a viscosity of Z-6 on the Gardner-Holdt scale.

Instead of using linseed oil in this treatment other drying oils such as China-wood oil, perilla oil, oiticica oil, etc., may be employed. Generally the added drying oil should amount to 10 to 20 per cent of the weight of the semi-drying oil, e. g., soya bean oil is used as a starting material also. Instead of using the drying oil as such, drying oil acids and an equivalent amount of glycerine can be employed. The results are generally better when using the drying oil itself, however.

Instead of fumaric acid, other polycarboxylic acids and their anhydrides may be employed. Among these are maleic acid, fumaric acid and their anhydrides, as well as derivatives of these acids capable of esterifying hydroxyl groups. Improved products result from utilizing phthalic acid as the polybasic acid.

As noted in the aforesaid copending applications, polyhydric alcohols in general appear to possess broad utility in the present process. While glycerine has been selected for illustrative purposes in the foregoing example, the invention is in no way limited to the use of trihydric alcohols. The dihydric alcohols such as ethylene and propylene glycol, may be employed in accordance with the invention to greatly improve the oil. The same is true of the polyhydric alcohols containing more than three hydroxyl groups in the molecule, for example the erythritols such as penta-erythritol, and the hexahydric alcohols such as manitol and sorbitol. In fact, somewhat superior results are obtained by the use of these latter compounds. Moreover the quantities employed on the weight of the starting mixture of oil, should fall within the approximate range of from 1 to 7 per cent. Thus, while the optimum proportioning of both the polyhydric alcohol and polybasic acid may vary somewhat for each agent, nevertheless an appreciable improvement appears to occur in all cases where the amounts of ingredients fall within the range stated.

Other catalysts for alcoholysis may be employed instead of the litharge mentioned in the specific example.

The proportion of added drying oil need not in all cases fall within the preferred range of 10-20 per cent on the weight of the semi-drying oil. The advantages of the drying oil addition are apparent even when added in smaller or larger quantities and any substantial addition results in some improvement in the final product.

The new oil obtained in accordance with this invention dries very rapidly to a non-tacky film, this requiring much less time than that normally required for polymerized linseed oil and other drying oils. For example, this new product will dry to a dust-free film in 4 or 5 hours, as compared with about 48 hours which is generally required for polymerized linseed oil. Furthermore, the film obtained by drying this oil is much harder and more waterproof than the films ordinarily obtained with drying and semi-drying oils. A further advantage of the treatment is that it produces an oil which polymerizes very rapidly.

It will be noted that in the foregoing illustrative embodiment, which represents a preferred operation under the invention, the proportion of polycarboxylic acid utilized varies somewhat from the proportion of the polyhydric alcohol. As will be understood from the above this follows from the stoichiometrical relationship necessary to form the optimum product having a low acid number. It will be further understood that in preparing such products the stoichiometrical proportion of polycarboxylic acid which is approximately sufficient to esterify all the free hydroxyl groups introduced, without any appreciable excess of carboxylic groups will depend upon the relative molecular weights of the reactants and their molar combining ratio. Accordingly while the range 1 to 7 per cent is relatively critical in the case of the polyhydric alcohol it is relatively less critical as applied to the carboxylic acid and represents more of an approximation in preparing oils of optimum low acid number.

The present application is a continuation-in-part of my copending application Serial No. 392,556, filed May 8, 1941. Reference may be had to my copending application Serial No. 475,652, filed of even date herewith, as well as my copending application Serial No. 392,555, filed May 8, 1941, as disclosing the more specific details of the process whereby the drying and semi-drying oils are improved in respect to drying and polymerizing properties.

While my invention has been described hereinabove with special reference to certain features and embodiments thereof which are now considered advantageous, it is to be understood that my invention is not limited thereto but may be otherwise practiced and embodied within the scope of the appended claims.

What I claim is:

1. A process of manufacturing improved drying oils from semi-drying oils which comprises heating a mixture comprising a major proportion of a semi-drying oil and a minor proportion of a drying oil with approximately from 1 to 7 per cent on the weight of the oil of a polyhydric alcohol until reaction is substantially complete and esterifying the reaction product with approximately 1 to 7 per cent on the weight of the oil of a polybasic acid of the class consisting of polycarboxylic acids and their anhydrides, to form an oil of low acid number.

2. The process of claim 1 wherein the semi-drying oil is soya bean oil.

3. The method of claim 1 wherein the drying oil is linseed oil.

4. The method of claim 1 wherein the drying oil is present in a proportion between about 10 and 20 per cent by weight of the amount of semi-drying oil.

5. The method of claim 1 wherein the polyhydric alcohol is glycerine.

6. The method of claim 1 wherein the polybasic acid is fumaric acid.

7. The method of claim 1 wherein the polybasic acid is maleic acid.

8. The method of claim 1 wherein the polyhydric alcohol is penta-erythritol.

9. A process of manufacturing improved drying oils capable of bodying rapidly to a fast drying product which comprises heating a mixture comprising a major proportion of a semi-drying oil and a minor proportion of a drying oil with approximately from 1 to 7 per cent on the weight of the oil of a polyhydric alcohol until reaction is substantially complete and reacting the reaction product with an amount of polycarboxylic acid falling within the range of approximately 1 to 7 per cent on the weight of the oil and just sufficient to form a product of low acid number.

10. A process of manufacturing improved drying oils from semi-drying oils which comprises heating a mixture comprising a major proportion of a semi-drying oil and a minor proportion of a drying oil with approximately from 1 to 7 per cent on the weight of the oil of a polyhydric alcohol until reaction is substantially complete and esterifying the reaction product with a polybasic acid of the class consisting of polycarboxylic acids and their anhydrides, said acid being added in approximately that combining proportion just sufficient to esterify all of the free hydroxyl groups present in the reaction mixture and to form an oil of low acid number.

ALEXANDER SCHWARCMAN.